United States Patent [19]

de Sivry et al.

[11] 4,314,135
[45] Feb. 2, 1982

[54] POSITIONING OF ONE OR MORE TOOLS RELATIVE TO A TUBULAR STRUCTURE

[75] Inventors: Bruno J. M. de Sivry, Neuilly; Claude R. Carsac, Saint Leu la Foret; Jean-Pierre Hamon, Saint Ouen L'Aumone, all of France

[73] Assignee: Compagnie Francaise des Petroles, Paris, France

[21] Appl. No.: 98,441

[22] Filed: Nov. 29, 1979

[30] Foreign Application Priority Data

Nov. 29, 1978 [FR] France ............................... 78 33661

[51] Int. Cl.³ .............................................. B23K 15/00
[52] U.S. Cl. ......................... 29/121 EU; 219/121 EC
[58] Field of Search ................. 219/121 EB, 121 EC, 219/121 ED, 121 EL, 121 EM, 121 EN, 121 EX, 121 EY, 121 EW, 121 EU, 60 A, 124.34, 125.11, 124.22, 124.4, 124.1, 125.1; 228/8, 9, 10, 49 R, 49 B; 33/174 L, 185 R; 173/2; 409/133, 186, 193, 218; 364/107, 474; 318/648, 576

[56] References Cited

U.S. PATENT DOCUMENTS

| | | | |
|---|---|---|---|
| 3,483,352 | 12/1969 | Schollhammer | 219/121 EL X |
| 3,614,909 | 10/1971 | Neuser | 409/218 |
| 3,633,011 | 2/1972 | Bederman et al. | 364/107 |
| 3,819,902 | 6/1974 | Sidbeck et al. | 228/9 X |
| 4,088,865 | 5/1978 | Peters et al. | 219/60 A X |
| 4,196,334 | 4/1980 | Thome | 219/60 A X |

*Primary Examiner*—C. L. Albritton
*Attorney, Agent, or Firm*—Sughrue, Mion, Zinn, Macpeak and Seas

[57] ABSTRACT

In the positioning of an assembly of work tools which are required to operate in the plane of the end face of a tubular structure, which is not necessarily orthogonal to the axis of the structure, a theoretical end face is determined by three sensing arms spaced apart by 120°, which, by an axial translatory movement followed by two pivotal movements about axes parallel to lines joining pairs of the arms, is brought into coincidence with the actual end face of the structure, then the plane of operation of the tools is brought into coincidence with the plane of coincidence of the theoretical and actual end faces.

The work tools may for example be electron beam welding guns for welding an additional tubular element to an existing tubular structure.

11 Claims, 5 Drawing Figures

POSITIONING OF ONE OR MORE TOOLS RELATIVE TO A TUBULAR STRUCTURE

The present invention relates to the positioning of one or more tools, the operation of which is required to occur in the plane of the end face of a tubular structure, by rotation of the tool or tools about an axis orthogonal to the plane of the end face, said axis possibly having an angular deviation from the axis of the tubular structure.

The need for such positioning arises especially when it is required to operate with a high degree of precision in the plane of the end face of a tubular structure, when the plane of the end face is not necessarily orthogonal to the axis of the structure. In such cases errors, even very small ones, may seriously compromise the performance of the proposed operations.

In the assembling, by electron beam welding, of two large-diameter pipes of substantial thickness, because of the very small aperture of the electron beam, the tolerance imposed on the distance which may exist in places between the two pipes placed end-to-end is less than half a millimeter, in order to make the weld acceptable; a tolerance of the same order is also imposed between the plane in which the tool or tools—electron guns in this case—must move and the plane of the end face of one of the pipes to be assembled, this plane being taken as a reference plane.

According to one aspect of the present invention there is provided a method of positioning a work tool, the operation of which is required to occur in the actual plane of the end face of a tubular structure by rotation of said tool about an axis perpendicular to said plane, said axis having an angular deviation from the axis of said tubular structure, said method comprising defining an imaginary plane by defining three points in said imaginary plane angularly spaced from one another, said imaginary plane being initially capable of having an angular deviation from said actual plane of said end surface of said tubular structure, bringing said imaginary plane nearer said actual plane of said tubular structure by displacement in a direction substantially parallel to said axis of said tubular structure, and then pivotting said imaginary plane about predetermined pivotting axes until said three points defining said imaginary plane are all located in said actual plane of said end face of said tubular structure.

Thus it is sufficient to associate the position of the plane of operation of said tool with said imaginary plane to obtain the desired positioning. Advantageously the plane of operation of the tool follows the pivotting movement of said imaginary plane automatically. For example sensors defining said points of said imaginary plane and said work tool may be mounted on the same component so that, when the imaginary and actual planes are coincident, all that remains is to produce a translation of the tool so that it is located in the correct position.

Advantageously, and particularly simply, said pivotting axes are parallel to lines joining pairs of said points defining said imaginary plane. In fact, in that case, it is sufficient to produce a first pivotting movement of said imaginary plane about a first axis parallel to the line passing through a first one of said points which is that nearest the actual plane and through a second one of said points to locate the first and third ones of said points in the actual plane, and a second pivotting movement about a second pivotting axis parallel to the line passing through the first and third points to locate the second point in the actual plane of the end face of the tubular structure.

In an actual arrangement, the points may be defined by sensors carried by a ring, the rocking axes of which are lines joining points of articulation of the ring on the ends of adjustable connecting members of the column type, constituted for example by the rods of screw or fluid jacks, by racks or by similar members. These connecting members are advantageously connected to the ring by articulations of the ball joint type, means being provided for permitting compensation of deviations in the distances between the points of articulation during rocking, for example by mounting the articulations on slides.

Advantageously the sensors are themselves capable of being displaced in a direction perpendicular to the ring which carries them and the values of such displacements can be measured by pick-ups associated with the sensors. Thus, it is to be understood that the ring is correctly oriented when the three sensors are in contact with the end face of the tubular structure and the three pick-ups indicate the same value. Thus, these pick-ups may control the automatic positioning of the ring, and they enable the distance between the actual plane and the ring to be determined for positioning the tool.

The automatic positioning of the ring carrying the sensors is simplified when the pivotting axes are parallel to the lines joining pairs of the points which define the imaginary plane, as already stated. Then the first pivotting movement is stopped when the pick-ups of the first and third sensors give the same indication, and the second pivotting movement is stopped when the pick-up of the second sensor gives the same indication as that of the first and third sensors.

When the pivotting axes are not coincident with the lines joining the pairs of the points which define the imaginary plane and are, for example, parallel to these lines, it may be necessary to provide, before each pivotting movement or certain pivotting movements, a movement in translation of the assembly of the points, that is to say of the sensors, in a direction opposite to that of the displacement bringing the first of the points into the actual plane.

In the case of the above two pivotting movements, all the sensors are raised before the first pivotting movement and, in particular, the first sensor is spaced from the actual plane but the first pivotting movement returns the first sensor to the actual plane at the same time as it brings the third sensor into the actual plane. Similarly, before the second pivotting movement, all the sensors are raised and, in particular, the first and third sensors are spaced from the actual plane but the second pivotting movement brings them into the actual plane at the same time as it brings the second sensor into the actual plane.

According to another aspect of the present invention there is provided apparatus for use in carrying out the above method comprising a frame adapted to be arranged to be coaxial with the tubular structure and containing a first ring on which sensors defining said three points of said imaginary plane and said work tool are mounted, and a support cooperating with connecting means to be supported on the structure, said first ring being supported on the support by an assembly of adjustable members of the column type and adapted to effect pivotting movement of the first ring.

In a preferred embodiment, the connecting means comprises a plurality of radially slidable clamping arms arranged to be distributed regularly around the circumference of the tubular structure and to act on one cross-section of said structure, a cross-section assumed to be substantially perpendicular to the axis of the structure so that the support is coaxial with the tubular structure. The assembly of the clamping arms supports the frame containing all the elements necessary for the positioning to be performed and also the work tool or tools and the elements for positioning and for moving the tools, the assembly of all said elements and tools being floatingly mounted inside the frame. By virtue of the clamping arms, the frame of the apparatus is substantially centered with reference to the tubular structure.

The sensors may comprise sensing arms arranged radially at 120° with respect to each other for sensing the end surface of the tubular structure. The sensing arms may be arranged to cooperate with as many movement pick-ups which indicate the movements of the respective sensing arms and may be displaced by means, for example, of precision screw jacks controlled by motors.

The above-described method may be applied to the assembly by electron beam welding of an additional tubular element to the end of the tubular pipe of the same characteristics, which pipe is in the course of being laid on a seabed, from a floating platform. The regulation of the work plane of the or each electron beam gun is ensured by the means described above. In such a case the frame of the apparatus is arranged to constitute a caisson and, in addition to the elements and tools, may be provided with an assembly of appropriate seal elements of known type, preferably inflatable seals.

A sealing system may also be provided between the frame, forming the caisson, the existing pipe, and the additional tubular element. This system may comprise a number, e.g. 3, of elements in the form of circular sectors arranged radially around both the tubular structure and around the additional element. Each of said sectors may be movable along a radial slideway to clamp against the structure or the additional element, with appropriate seals arranged between the various abutting surfaces to effect the desired fluid-tightness.

Embodiments of the present invention will now be described, by way of example only, with reference to the accompanying drawings.

Figure 1:
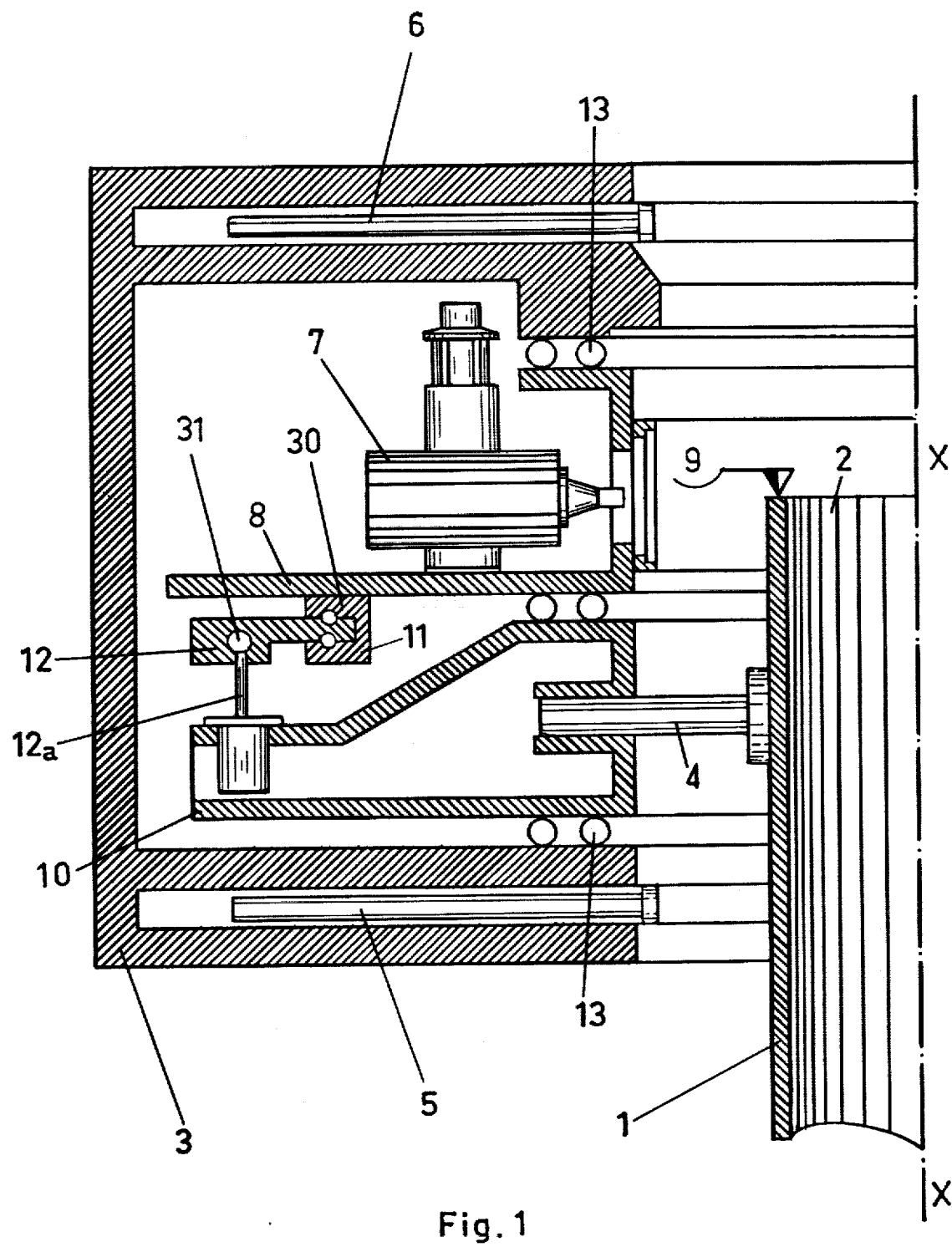
FIG. 1 is a schematic vertical section through an embodiment of apparatus for use in carrying out an embodiment of the method according to the invention, of assembling by electron beam welding two tubular components.

In FIG. 1, there is shown the upper part of a tubular structure 1, and a frame 3 of an embodiment of apparatus according to the invention and including the main elements which said apparatus comprises. For the sake of simplicity, only those parts of the tubular structure and of the apparatus located to the left of the axis X—X of the structure 1 have been illustrated. The tubular structure 1 has an end face 2, the plane of which is not necessarily perpendicular to the axis X—X. The frame 3 of the apparatus is arranged coaxially relative to the structure 1 and comprises an assembly of clamping arms 4 for bearing on the external cylindrical surface of the structure 1 to maintain the frame 3 in a fixed position with reference to the tubular structure. Slidable sectors 5 are intended conjointly to effect sealing of the lower end of frame 3 to the structure 1. Slidable circular sectors 6, identical to the sectors 5, are provided to effect sealing of the frame 3 to an additional tubular structure (not shown).

An electron gun 7 is mounted on a circular support ring 8, upon which ring the gun 7, together with a number of other guns which may be associated with it, are capable of rotating about an axis perpendicular to the plane of the ring during a welding operation.

Figure 2:
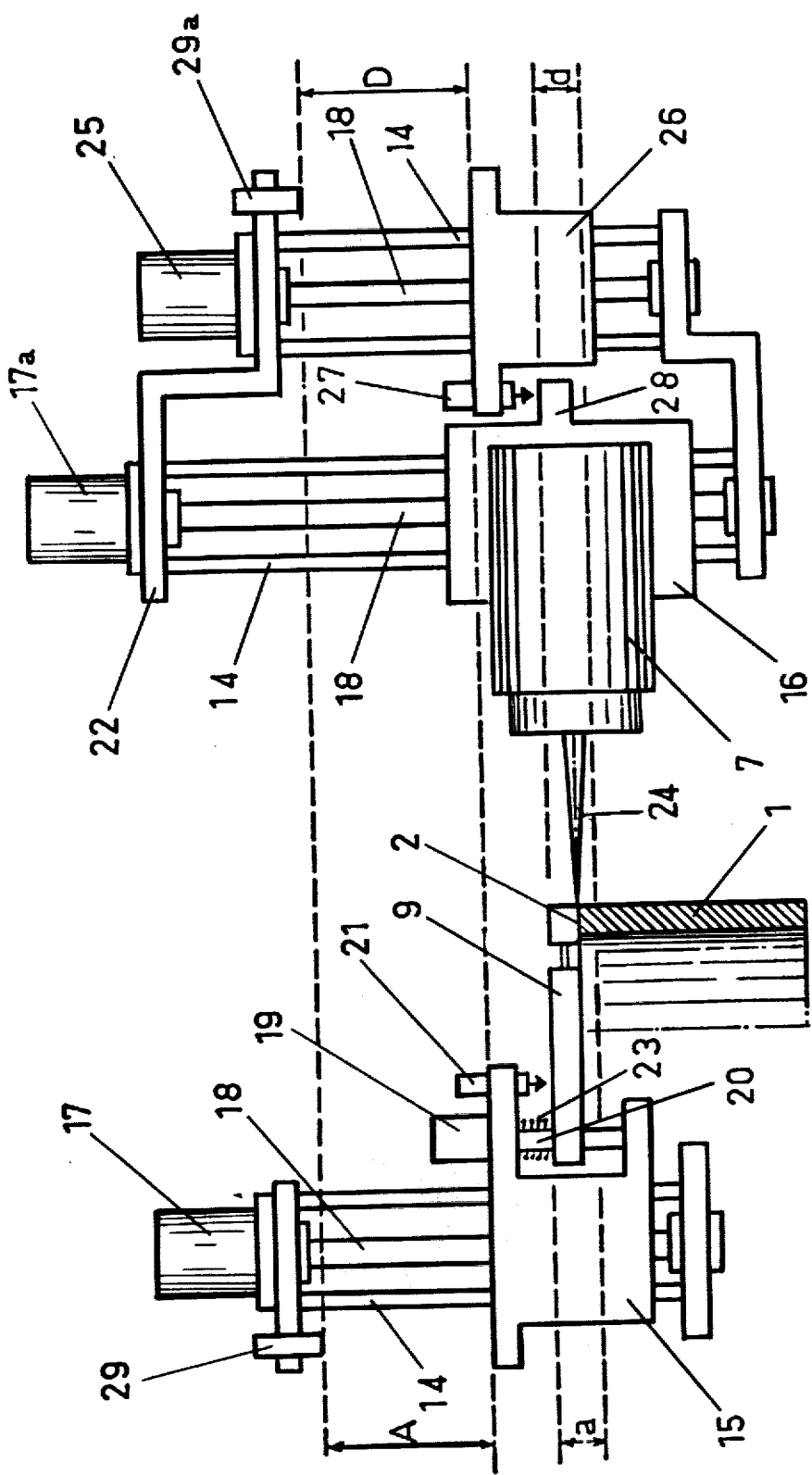
FIG. 2 is a vertical section through part of an apparatus similar to that of FIG. 1, according to the present invention.

Sensing arms 9, of which one is shown in FIG. 1 and which will be described in greater detail with reference to FIG. 2, are also supported by the ring 8, by means of elements which will also be described hereinbelow. The arms define three points on a theoretical end face which is initially in a plane perpendicular to the axis X—X and which, as will be described, is moved into coincidence with the end face of the structure 1.

The ring 8 is itself supported by a support 10 through the intermediary of a bearing 30 mounted in a cage 11 and carrying a ring 12. Bearing ring 12 carries on its circumference three screw jacks, of which jack 12a is shown, and which are fixed to the support 10, which has a circular part and with which the sliding clamping arm 4 cooperates. Seal elements 13 are arranged between the above described elements and delimiting with the latter a first fluid-tight enclosure within the frame 3.

A second fluid-tight enclosure is delimited by the assembly of the seals 13, the second enclosure being contained between the frame 3, the tubular structure 1 and, when it is in position, the additional structure which is to be assembled to the structure 1. Lastly, a third fluid-tight enclosure is provided bounded, within the additional element and the tubular structure, by a centering core (not shown), which comprises the necessary seal elements, the role of the third fluid-tight enclosure being, in the case of an electron beam welding operation, in maintaining the required vacuum round the assembly joint and on both sides of the joint.

Figure 3:
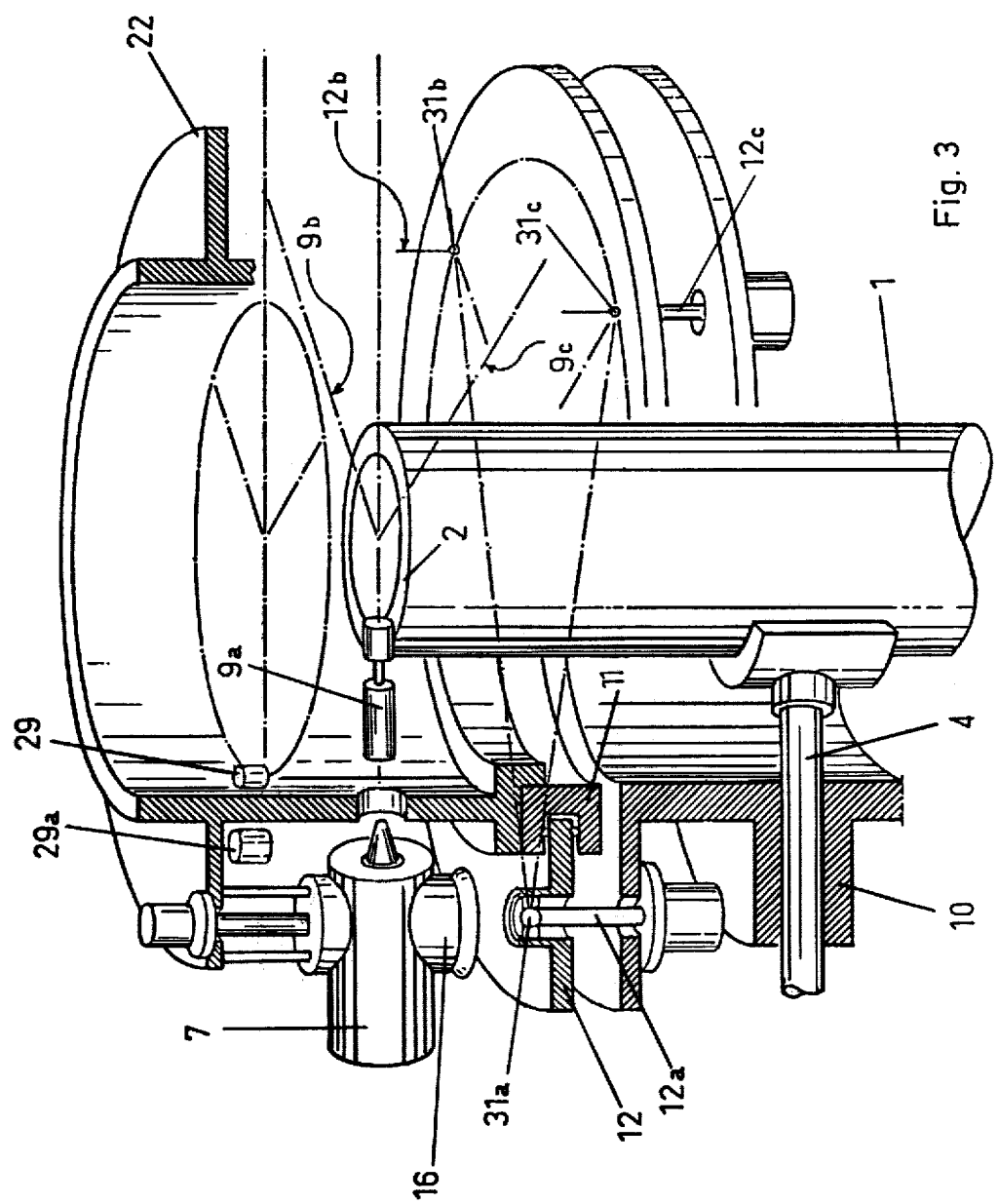
FIG. 3 is a schematic perspective view of an apparatus similar to that of FIG. 1, according to the present invention.

The sensing arm 9 is also shown in FIGS. 2 and 3, in which it is illustrated bearing against the closest point of the end face 2 of the structure 1.

The circular ring 22 shown in FIGS. 2 and 3 is a modification of the ring 8 of FIG. 1. The ring 22 supports the electron gun or guns 7, and the corresponding sensing arms 9. Each of the sensing arms 9 and each electron gun 7 is mounted on a respective slide 15 or 16, the slides being movable in translation along slideways 14, the movements being caused by a motor 17 and a precision screw 18 for the sensors, and a direct-current motor 17a and precision screw 18a for the electron guns 7. For the sensing arms, the translatory movements are broken down into two phases: a first rapid phase and a second greatly stepped-down slow phase, in order to increase the sensitivity of the sensor on approaching contact with the end face of the structure.

The upper part of each arm 9 bears against a movement pick-up 21 exhibiting a resolution of the order of one hundredth of a millimeter. Each sensor 21 comprises, in known manner, gauging means for the stroke of the arm 9 with respect to the slide 15. The said arm 9 is mounted on a ball sleeve, of known type and not shown, which leaves it free to move vertically, the arm 9 being constantly urged downwards by a spring 23.

Motor 19 driving shaft 20 in rotation permits the arm 9 to be retracted in order to free the axis of the electron beam 24 at the required time.

Positioning of the electron gun 7 is performed in two stages. In a first stage, a stepping motor 25, forming part of a device known as a "dimension transfer device", and synchronised with the stepping motor 17, imparts to a slide 26 a movement in the same sense and of the same value as that imparted by the motor 17 to the arm support slide 15. A movement pick-up 27, of the same type as the pick-up 21, forms a stop intended to stop, in a second phase, the shoulder 28 carried by the gun support slide 16, at a point of its stroke such that the electron beam 24 is then strictly in alignment with the plane of the end face 2 as detected by the sensing arms 9 and the complete positioning operation has been accomplished, as will be explained hereinbelow, still with reference to FIGS. 2 and 3.

The gun carrying slide 16 is placed in its lowest position initially and driven by the direct-current motor 17a in the upward sense, along the slideways 14 by means of the precision screwthreaded axle 18, up to contact of the shoulder 28 with the pick-up 27.

The complete positioning operation will be described hereinbelow, still with reference to FIGS. 2 and 3. The three slides 15 corresponding to the three sensing arms 9 arranged at 120° to each other, are placed in an upper position, determined by three, e.g. electric, stops 29, said three stops being arranged so as to be located in a plane strictly parallel to the plane defined by the bearing 30 and the ring 12, said plane being that in which the electron guns are required to move in their movement round the welding line.

The three mutually synchronised stepping motors 17 are started simultaneously, which causes the three sensing arms 9 to descend simultaneously. After a certain travel, this movement is stepped down and continues until contact occurs between one of the three arms 9 and the nearest point of the end face 2. This contact causes the immediate stopping of the downward movement of the three slides 15 carrying the sensing arms.

The corresponding movement pick-up 21 then indicates a certain value for the position of the sensing arm 9 with respect to the slide 15.

It is then necessary to bring the other two sensing arms into contact with the end face 2 of the structure.

To this end, considering the three screw jacks 12a, 12b and 12c (FIG. 3), the cylinders of which are fixed to the support 10 and the rods of which are articulated on the ring 12 by joints 31a, 31b, 31c; corresponding to the three respective sensing arms 9a, 9b, 9c, first the arm 9b is brought into contact with the end face 2 of the structure by acting upon the jack 12c so as to cause the ring 12, and consequently the ring 22, to rock or pivot about an axis joining the ball joints 31a and 31b which are located level with the respective jacks 12a and 12b.

Having effected this, the ring 22 is again pivotted, but this time by acting upon the jack 12b, the pivotting occurring about an axis passing through the ball joint 31a and 31b, to bring the sensing arm 9c into contact with the end face 2.

As previously mentioned, the ball joint 31a, 31b and 31c may be mounted on slides. There may also be a fixed ball joint mounted on a slide and an articulation supported simply against the ring 12 and thus being capable of displacement in all directions. Other arrangements can, of course, be adopted to allow the distances between the articulations to change during pivotting.

A precaution may be necessary in order to avoid risk of deterioration of the elements of the apparatus during the various pivotting movements; it may be necessary to ensure that there is no risk of any premature contact occurring between the moving elements. Thus each of the three slides 15 could be raised by a certain distance, which is the same for all three, before each of the pivotting movements, this raising not preventing the desired pivotting of the ring 22 because the pivotting movements are stopped only when the movement pick-ups 21 indicate the same value for the positions of the arms 9 relative to the slides 15, as far as the first and third arms are concerned during the first pivotting movement and as far as all three arms are concerned during the second pivotting movement.

Having reached this point, coincidence of the respective planes of the theoretical end surface and of the actual end face has been achieved. In order to perfect the regulation, it is only necessary to bring each of the slide 16 of the guns 7 to the required level, which is determined by the respective pick-up 27, each of which must, at the end of the regulation, indicate the same value as is indicated by the pick-ups 21.

Figure 4:
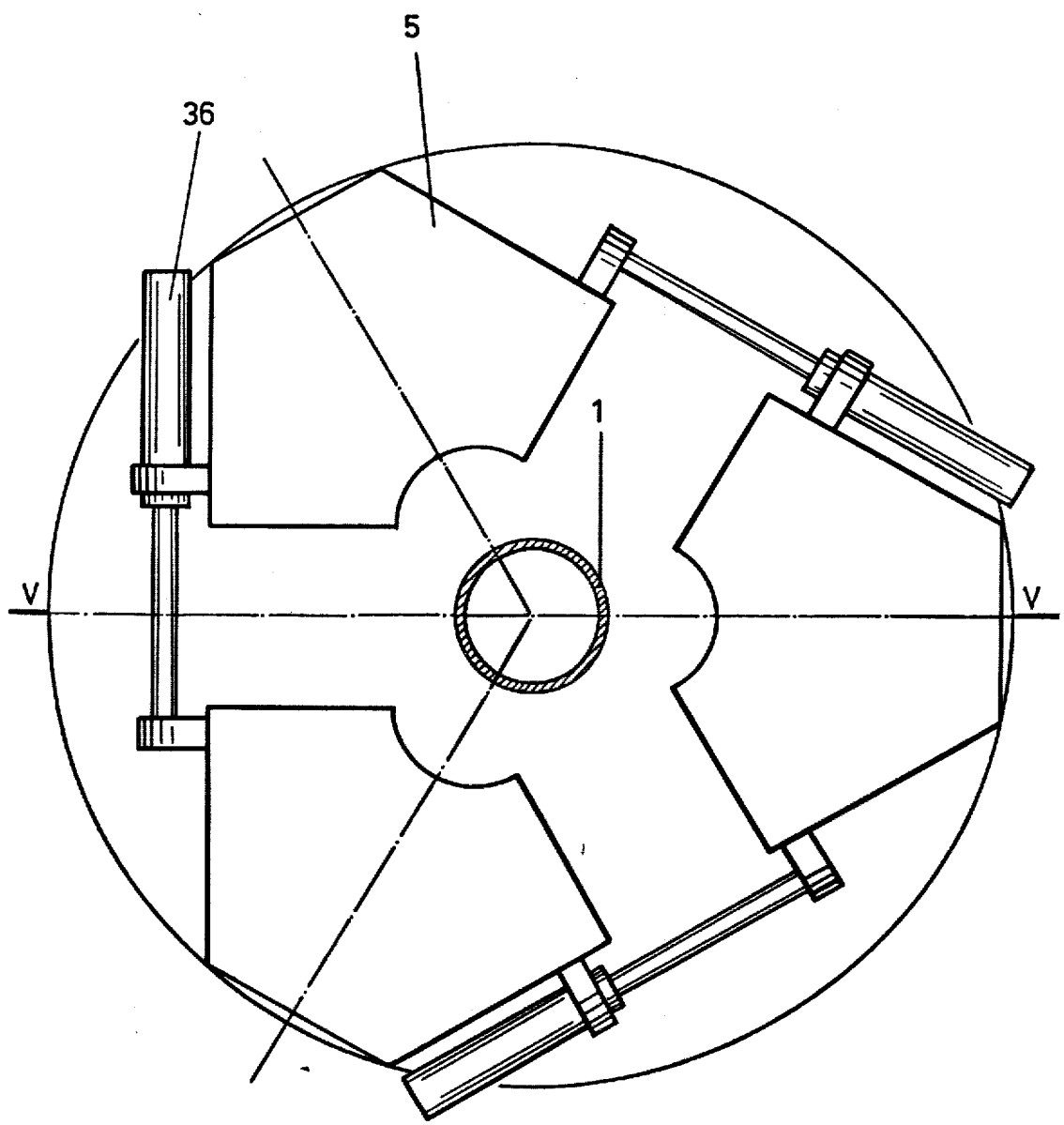
FIG. 4 is a plan view, in an isolated position, of a sealing device for use with the apparatus of FIGS. 1 to 3, in the particular case where the work tools are electron guns.
Figure 5:
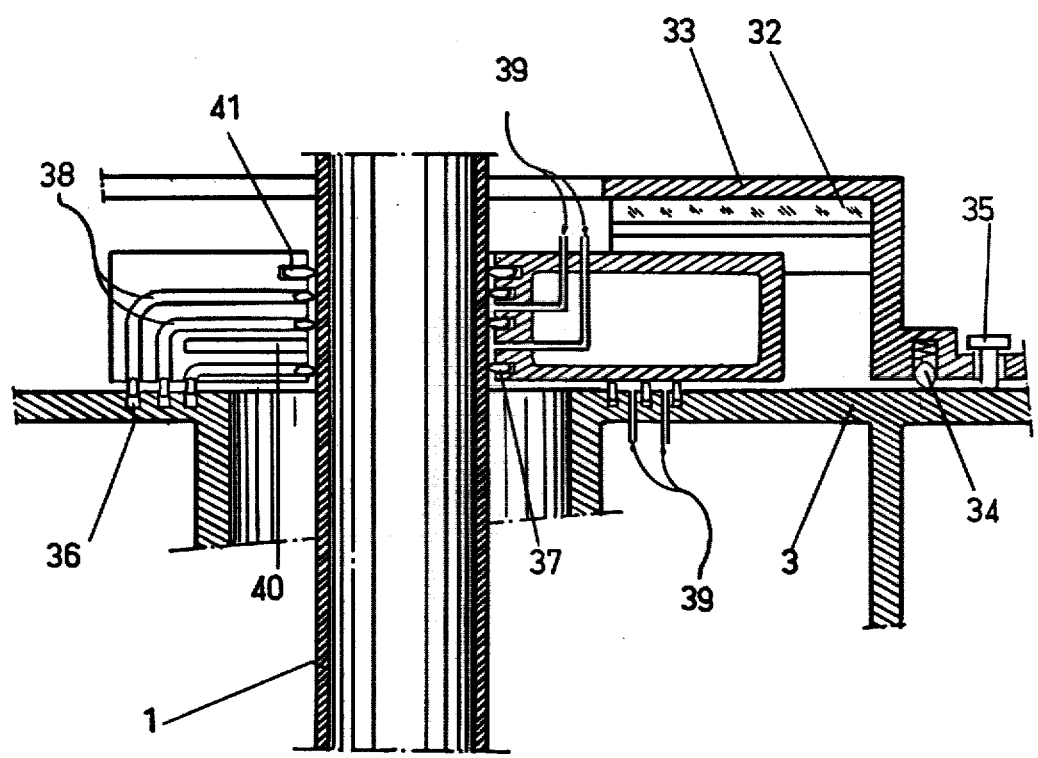
FIG. 5 is a section along the line V—V of FIG. 4, with the sealing device shown in its operative position.

FIGS. 4 and 5 illustrates the details of the end sealing means shown very schematically in FIG. 1, for the case where the work tool is an electron gun.

In FIG. 4 there are shown the three circular sector-shaped elements 5 angularly spaced by 120° from each other around the tubular structure 1 or, as the case may be around the additional element if any, the sectors then being designated by the reference numeral 6.

These various sectors are arranged so as to be movable along radial slideways 32 (FIG. 5) supported by a plate 33 which is arranged to float with reference to the frame 3, e.g. by an assembly of balls 34 and pins 35. Clamping is achieved, e.g. by means of jacks 36, oriented tangentially to an imaginary circle concentric with the structure 1.

An assembly of seals 37 is provided both on the part of the tubular structure 1 and on the part of the frame 3. Flat seals 38 are arranged on the opposed faces of the various sectors. These seals are attached against the seals 37, e.g. by sticking.

Means may also be provided for evacuating, e.g. through pipes 39, the spaces between the various seals to maintain the high vacuum necessary for the electron beam welding operation.

A key 40 loaded with lead is provided forming a protective chicane against X-rays; seals 41, likewise loaded with lead, effectively complete this protection.

In their inoperative position (shown in FIG. 4) the sealing sectors 5, 6 should provide an axial passage of considerable diameter, of the order of twice the outside diameter of the structure 1. The vacuum obtaining within the apparatus is of the order of 1 millibar.

The present invention is not intended to be limited to the embodiment which has just been described, since modifications of detail could be made to it without thereby departing from the scope of the invention.

Thus the two sealing means formed by the assemblies of sectors 5 and 6, associated with the frame 1, may be replaced by any other equivalent means, such as lip seals, inflatable seals etc.

In the above described apparatus, the number of jacks 12a, 12b and 12c, or equivalent members, is equal to the number of sensing arms, that is to say three, and these jacks are arranged geometrically so as to cause the axes of pivotting of the ring 22 to correspond to the positions of the sensing arms to simplify the operation. However a number of jacks higher than three may be used and may be arranged in any suitable manner, the coincidence of the imaginary and actual end surfaces being obtained when the three pick-ups 21 indicate the same value.

What is claimed is:

1. A method of positioning a work tool, the operation of which is required in an actual plane of an end face of a tubular structure of rotation of said tool about a first axis perpendicular to said actual plane, said first axis having an angular deviation from an axis of said tubular structure, said method comprising defining an imaginary plane by defining three points by means of sensors connected to a support, said points being angularly spaced from one another, said imaginary plane being parallel with said support and being initially capable of having an angular deviation from said actual plane of said end face of said tubular structure, bringing said imaginary plane near said actual plane of said tubular structure by a displacement in a direction substantially parallel to said axis of said tubular structure, and then pivotting said support and said imaginary plane about predetermined pivotting axes until said three points defining said imaginary plane are all located insaid actual plane of said end face of said tubular structure, said work tool being connected to said support.

2. A method according to claim 1, wherein said pivotting of said imaginary plane is effected by first pivotting said imaginary plane about a first pivotting axis parallel to a line passing through a first one of said points which is nearest to said actual plane and a second one of said points so as to bring said first point and said third point into said actual plane, and by then pivotting said imaginary plane about a second pivotting axis parallel to a line passing through said first and said third points so as to bring said second point into said actual plane, thereby bringing said actual plane and said imaginary plane into coincidence.

3. A method according to claim 1 or claim 2, wherein a plane of operation of said tool follows said pivotting movements of said imaginary plane and is then adjusted by translation with respect to said coincident imaginary and actual planes.

4. Apparatus for positioning a work tool so as to operate in a plane perpendicular to an end face of a tubular structure, comprising a frame adapted to be arranged substantially relative to said tubular structure and including:
   support;
   connecting means carried by said support for mounting said tubular structure to said support;
   a first ring;
   at least three sensors mounted on said first ring and defining three points defining an imaginary plane, and a working tool mounted on said first ring; and
   a plurality of vertically adjustable members supporting said first ring upon said support, and operable to effect pivotting of said first ring whereby said imaginary plane may be brought into coincidence with said plane perpendicular to said end face.

5. Apparatus according to claim 4, wherein said adjustable members act indirectly on said first ring through a second ring connected to said first ring by connection means permitting relative rotation of said rings.

6. Apparatus according to claim 4, wherein each sensor is mounted on a slide carried by said first ring, each said slide enabling the a respective one of said sensors to be displaced in a direction perpendicular to the plane of said first ring.

7. Apparatus according to claim 6, including a slide follower which is displaced synchronously with each said slide of said sensors and wherein said tool is mounted on a further slide, the position of which is defined by the positions of said slide followers when said tool is in operation.

8. Apparatus according to claim 6, including a first electrical pick-up for measuring the displacement of each respective sensor with respect to its slide.

9. Apparatus according to claim 8, wherein said slide follower comprises a further electrical pick-up which follows said first pick-up and indicates the same value of displacement at the end of a position adjustment of said first ring so as to constitute an abutment for a shoulder of said slide carrying said tool and to define the position thereof.

10. Apparatus according to claim 6, wherein each sensor carrying slide is displaceable by a screw controlled by a stepping motor.

11. Apparatus according to claim 4, wherein seal means are provided between said frame, said first ring and said support, and wherein sectorial sealing elements are provided between said frame and said tubular structure.

* * * * *